(12) United States Patent
Gray et al.

(10) Patent No.: US 9,025,067 B2
(45) Date of Patent: May 5, 2015

(54) APPARATUS AND METHOD FOR IMAGE SUPER-RESOLUTION USING INTEGRAL SHIFTING OPTICS

(71) Applicant: General Electric Company, Schenectady, NY (US)

(72) Inventors: Daniel Curtis Gray, Niskayuna, NY (US); Kevin George Harding, Niskayuna, NY (US); Frederick Wilson Wheeler, Niskayuna, NY (US); Gil Abramovich, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/049,368

(22) Filed: Oct. 9, 2013

(65) Prior Publication Data

US 2015/0098013 A1    Apr. 9, 2015

(51) Int. Cl.
*H04N 5/225* (2006.01)
*H04N 5/238* (2006.01)
*G02F 1/01* (2006.01)
*G02F 1/13* (2006.01)
*G02B 5/30* (2006.01)

(52) U.S. Cl.
CPC .............. *H04N 5/238* (2013.01); *G02F 1/0136* (2013.01); *G02F 1/1313* (2013.01); *G02B 5/3083* (2013.01)

(58) Field of Classification Search
USPC .................. 348/335–344, 360, 361; 382/115
See application file for complete search history.

(56) References Cited

U.S. PATENT DOCUMENTS 5,315,411 A    5/1994 Blanding
6,359,681 B1    3/2002 Housand et al.
7,003,177 B1    2/2006 Mendlovic et al.
7,072,096 B2*    7/2006 Holman et al. ............... 359/298

(Continued)

FOREIGN PATENT DOCUMENTS

JP    2008243037 A    10/2008

OTHER PUBLICATIONS

McCormack et al., "Super-Resolution for a UGS System," Conference: Unattended Ground Sensor Technologies and Applications VII; Orlando, FL; USA; Mar. 28-Apr. 1, 2005, V: SPIE-5796, pp. 193-202.

(Continued)

*Primary Examiner* — Tuan Ho
(74) *Attorney, Agent, or Firm* — Ziolkowski Patent Solutions Group, SC; Jean K. Testa (57) ABSTRACT

An image capture device includes an electro-optics arrangement having an arrangement of polarizers, polarization sensitive optical elements, and polarization modulating elements. First and second polarization sensitive optical elements are provided having an edge displaced relative to a plane normal to an optical axis of the electro-optics arrangement. A control system coupled to the electro-optics arrangement controls the application of voltages to the polarization modulating elements to control the polarization rotation of the light input to the polarization sensitive optical elements, such that the optical path length of the polarization sensitive optical elements is changed to provide for capture of the object images at each of the different focal planes. The first and second polarization sensitive optical elements generate lateral image shifts between respective object images captured at the different focal planes responsive to the polarization rotation of the light input thereto.

22 Claims, 4 Drawing Sheets

(56) References Cited

U.S. PATENT DOCUMENTS

| | | |
|---|---|---|
| 7,420,592 B2 | 9/2008 | Freeman |
| 7,551,771 B2 | 6/2009 | England, III |
| 7,602,997 B2 | 10/2009 | Young |
| 8,824,779 B1 * | 9/2014 | Smyth .......................... 382/154 |
| 2008/0165359 A1 | 7/2008 | Mattox et al. |
| 2008/0175509 A1 | 7/2008 | Wheeler et al. |
| 2009/0245653 A1 | 10/2009 | Kochi et al. |
| 2010/0067822 A1 | 3/2010 | Young |
| 2010/0079608 A1 | 4/2010 | Wong et al. |
| 2012/0050517 A1 | 3/2012 | Harding et al. |
| 2012/0076369 A1 | 3/2012 | Abramovich et al. |
| 2012/0250947 A1 * | 10/2012 | Abramovich et al. ........ 382/115 |

OTHER PUBLICATIONS

Hendriks et al., "Improving resolution to reduce aliasing in an undersampled image sequence," Sensors and camera systems for scientific, industrial, and digital photography applications; Proceedings of the Conference, San Jose, CA; USA; Jan. 24-26, 2000, pp. 214-222.

Kaltenbacher et al. "High Resolution Infrared Image Reconstruction Using Multiple, Low Resolution, Aliased Frames," NAECON '96; Proceedings of IEEE 1996 National Aerospace and Electronics Conference, Dayton, OH; USA; May 20-23, 1996, pp. 702-709.

Lan et al. "Non-mechanical sub-pixel image shifter for acquiring super-resolution digital images," Optics Express, vol. 17, No. 25, pp. 22992-23002, Dec. 7, 2009; E-ISSN: 10944087; DOI: 10.1364/OE.17.022992; Publisher: Optical Society of America.

Young et al., "Superresolution image reconstruction from a sequence of aliased imagery," Applied Optics, vol. 45, No. 21, Jul. 20, 2006, pp. 5073-5085.

Liu et al., "Simultaneous measurement of birefringence magnitude and direction using Wollaston prism," Proceedings of SPIE vol. 8563, Nov. 20, 2012, pp. 85630P-1-85630P-7.

Abramovich et al., "Mobile, Contactless, Single Shot, Fingerprint Capture System," Proceedings of SPIE, vol. 7667, Apr. 5, 2010, pp. 766708-1-766708-12.

* cited by examiner

APPARATUS AND METHOD FOR IMAGE SUPER-RESOLUTION USING INTEGRAL SHIFTING OPTICS

GOVERNMENT LICENSE RIGHTS

This invention was made with U.S. Government support under contract number W911NF-11-C-0256. The U.S. Government has certain rights in the invention.

BACKGROUND OF THE INVENTION

Embodiments of the invention relate generally to a system and method for capturing images capable of use in super resolution image processing, and more particularly to a system and method for providing sub-pixel image shifts for capturing high resolution images for super resolution image processing. It incorporates rapid electro-optical elements to rotate the input polarization axis of light passing through one or more tilted birefringent optical elements, so as to provide for a plurality of image shift locations. The plurality of image shift locations provide for the generation of both super resolved images and a series of focused images for 3D reconstruction.

Super-resolution is a class of techniques that enhance the resolution of an imaging system. In some super-resolution techniques—termed optical super-resolution—the diffraction limit of systems is transcended, while in others—geometrical super-resolution—the resolution of digital imaging sensors is enhanced. The use of super-resolution techniques may be desirable in numerous applications, including, for example, for purposes of biometric identification, such as in systems that acquire contactless images of fingerprints and/or palm prints, as it is recognized that a threshold level of image resolution is required in the acquired images to provide Level IV biometric data performance levels—such as 1000 pixels-per-inch (PPI) or more.

In order to achieve such a level of high image resolution, a digital optical imaging system must have both high lens resolution and high pixel resolution. Often, the pixel resolution is the limiting factor due to cost and speed limitations. In some cases, high pixel resolution sensors are available, but are limited in speed and can be quite costly. In other cases, adequate pixel resolution is not possible using current digital image sensors.

A commonly employed super-resolution technique is the spatial frequency domain method described by Kim et al. (S. P. Kim, N. K. Bose, and H. M. Valenzuela. Recursive reconstruction of high resolution image from noisy under sampled multiframes. IEEE Transactions Acoustics, Speech, and Signal Processing, 20(6):1013-1027, June 1990.), where—through spatial frequency analysis of several images with sub-pixel image shifts—an improved image with greater resolution than the individual images can be generated. The sub-pixel image shifts utilized to provide the increased resolution are achieved either by shifting of the object or the image sensor.

It is recognized, however, that certain limitations are inherent with existing methods for achieving sub-pixel image shifts, such as the one described by Kim et al. For example, with respect to achieving sub-pixel image shifts by shifting the object, it is recognized that, in many cases, the object being imaged cannot be moved, or is stationary. Additionally, with respect to achieving sub-pixel image shifts by shifting the image sensor, such as by providing a small de-centering of the lenses or by the use of small optical wedges, it is recognized that cameras utilizing image sensor shifting are limited in speed due to the mechanical motion involved in shifting the sensor.

It would therefore be desirable to design a system and method of acquiring object images that solves the problem of inadequate pixel resolution of digital image sensors. It would further be desirable for such a system and method to provide faster, more repeatable, and more robust hardware for image shifting (i.e., sub-pixel image shifts) than is presently available for capturing images for super resolution image processing, without requiring motion of the object or sensor.

BRIEF DESCRIPTION OF THE INVENTION

Embodiments of the invention are directed to a system and method for providing sub-pixel image shifts for capturing high resolution images for super resolution image processing. Rapid electro-optical elements are employed to rotate the input polarization axis of light passing through one or more tilted birefringent optical elements, so as to provide for a plurality of image shift locations. The plurality of image shift locations provide for the generation of both super resolved images and a series of focused images for 3D reconstruction.

According to one aspect of the invention, an image capture device configured to capture images of an object includes an imaging camera lens system and an electro-optics arrangement positioned between the object and the imaging camera, with the electro-optics arrangement further including one or more polarizers configured to orient a polarization of light passing therethrough, a plurality of polarization sensitive optical elements having an optical path length that changes with different polarization states so as to provide for capture of the object images at each of a plurality of different focal planes, and a plurality of polarization modulating elements configured to selectively control a polarization rotation of light input to the plurality of polarization sensitive optical elements responsive to voltages applied thereto, with the plurality of polarization sensitive optical elements comprising at least a first polarization sensitive optical element and a second polarization sensitive optical element, with the first polarization sensitive optical element and the second polarization sensitive optical element having an edge displaced relative to a plane normal to an optical axis of the electro-optics arrangement. The image capture device also includes a control system coupled to the electro-optics arrangement and being configured to control the application of voltages to each of the plurality of polarization modulating elements to control the polarization rotation of the light input to the plurality of polarization sensitive optical elements, such that the optical path length of the plurality of polarization sensitive optical elements is changed to provide for capture of the object images at each of the plurality of different focal planes. The first and second polarization sensitive optical elements generate lateral image shifts between respective object images captured at the plurality of different focal planes responsive to the polarization rotation of the light input thereto.

According to another aspect of the invention, a method for acquiring images of an object via an image capture device includes providing an image capture device having an image forming optical lens and an electro-optic lens section, with the electro-optics lens section further including one or more polarizers configured to orient a polarization of light passing therethrough, birefringent windows that exhibit a different index of refraction depending on an input polarization of light passing therethrough wherein at least one of the birefringent windows has an edge displaced relative to a plane normal to an optical axis of the electro-optic lens section. and liquid crystal polarization rotators configured to selectively rotate an axis of the input polarization of light provided to the birefringent windows. The method also includes capturing an image of at least a portion of the object at each of a plurality of fixed focus positions by way of the image capture device, wherein capturing the object images at the plurality of fixed focus positions comprises selectively applying a voltage to the liquid crystal polarization rotators in the electro-optics lens section to rotate the axis of the input polarization of light provided to the birefringent windows and capturing an image of at least a portion of the object at each of the plurality of fixed focus positions responsive to the voltage applied to the liquid crystal polarization rotators, with images being captured at each of the plurality of fixed focus positions based on differing indexes of refraction of the birefringent windows. Each object image acquired at a respective fixed focus position has a sub-pixel lateral image shift as compared to object images acquired at adjacent fixed focus positions responsive to the axis rotation of the input polarization of light provided to the at least one birefringent window having the edge displaced relative to the plane normal to the optical axis of the electro-optic lens section.

According to yet another aspect of the invention, an electro-optics lens section for use in an image capture device configured to capture objects of an image at a plurality of different focal planes is provided. The electro-optics lens section includes one or more polarizers configured to orient a polarization of light passing therethrough and a plurality of polarization sensitive optical elements having an optical path length that changes with different polarization states so as to provide for capture of the object images at each of a plurality of different focal planes, with the plurality of polarization sensitive optical elements including at least a first polarization sensitive optical element and a second polarization sensitive optical element, with the first polarization sensitive optical element and the second polarization sensitive optical element being tilted relative to a plane normal to an optical axis of the electro-optics lens section and tilted in planes 90 degrees in rotation about the optical axis relative to each other. The electro-optics lens section also includes a plurality of polarization modulating elements configured to selectively control a polarization rotation of light input to the plurality of polarization sensitive optical elements responsive to voltages applied thereto, so as to enable capture of object images at a plurality of different focal planes. The tilted first and second polarization sensitive optical elements generate lateral image shifts between respective object images captured at the plurality of different focal planes responsive to varying of the polarization rotation of the light input to the plurality of polarization sensitive optical elements resulting from the voltages applied to the plurality of polarization modulating elements, such that no mechanical motion of the electro-optics lens section is needed in generating the lateral image shifts.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to a system and method for providing sub-pixel image shifts for capturing images for super resolution image. An image capture device for capturing such images includes an electro-optic lens section configured to provide image shifts. Based on control of the electro-optics, image shifting can be performed so as to form images at different locations—depending on the polarization of light.

Figure 1:
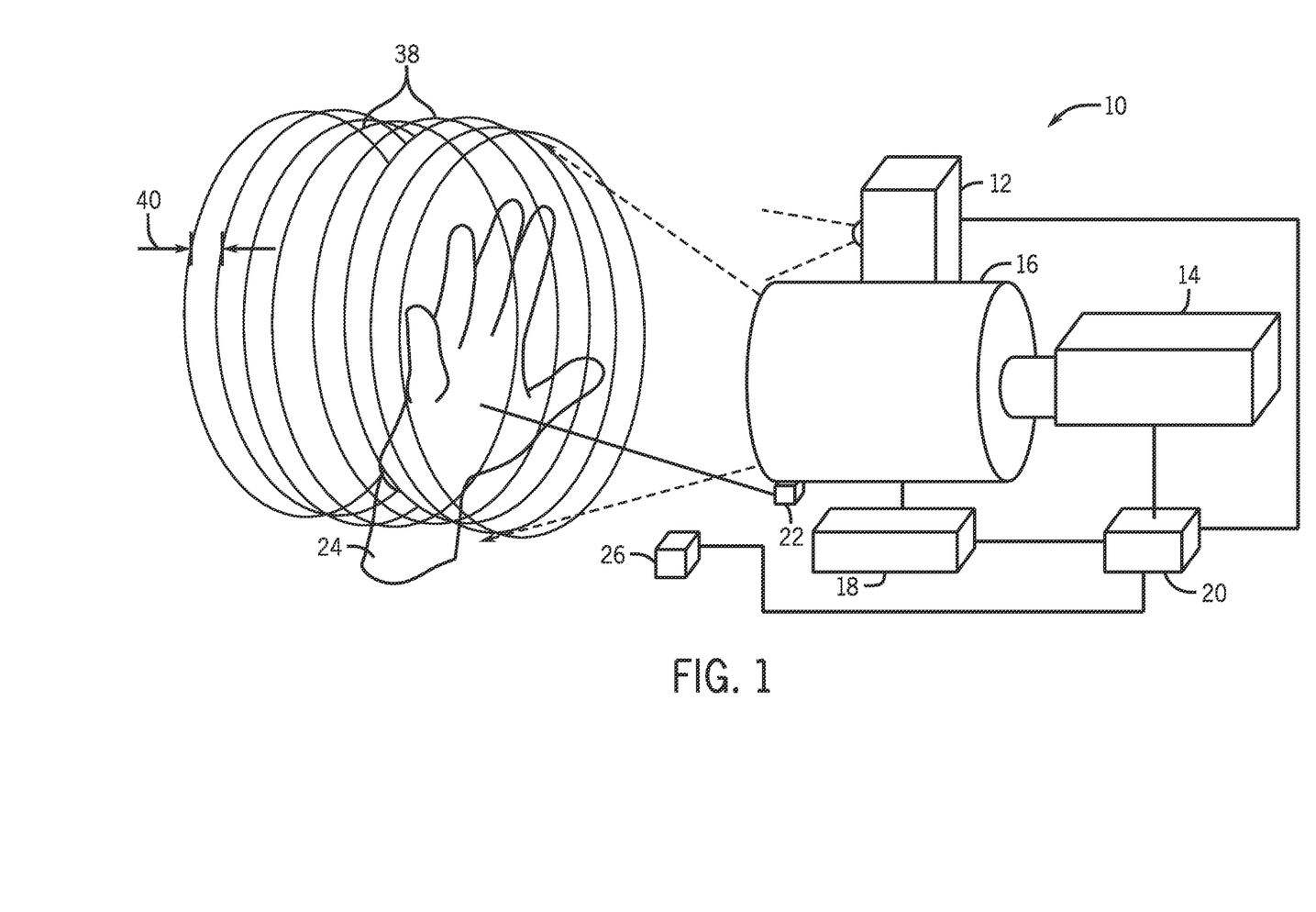
FIG. 1 is block schematic diagram of an image capture device according to an embodiment of the invention.

Referring to FIG. 1, a block schematic diagram of image capture device 10 is shown that can incorporate embodiments of the invention. The image capture device 10 includes a light source 12, an imaging camera image forming optical lens system 14, and electro-optics arrangement or lens section 16, that function together to collect or capture a plurality of images of a desired object—such as, for example, a plurality of handprint images of a person of interest taken at different effective focal distances to the hand, as will be described in detail below regarding an exemplary embodiment of the invention. With regard to the light source 12, it is recognized that the light source is an optional component that need not be included in image capture device 10; however, light source 12 beneficially enhances the ability of image capture device 10 to also do 3D reconstruction. A voltage source 18 is provided that selectively provides power to individual components of electro-optics 16, and a control system or processor 20 is provided to control operation of image capture device 10. Processor 20 controls operation of light source 12, camera lens system 14, electro-optics 16, and voltage source 18 to capture the plurality of images and also performs subsequent image processing of the captured images in order to provide, for example, a high-resolution composite image.

According to an embodiment of the invention, light source 12 is provided as a strobed light emitting diode (LED) light source that provides a high power beam of light and that can be quickly and dynamically controlled to emit bursts/pulses of light. Camera lens system 14 is in the form of a readily available commercial camera, such as a 16 megapixel camera capable of providing 600 pixels-per-inch (PPI) image resolution of the hand image, for example. It is envisioned, however, that a camera with a higher or lower resolution than 600 PPI could also be used in image capture device 10, with a camera having 500 PPI or greater being desired based on practical considerations. Camera lens system 14 is configured to acquire images having a high-resolution focus that necessitates a shallow depth-of-field (DOF). The electro-optics 16 provide the focus shift between each of the images acquired by camera lens system 14, with the electro-optics being configured to provide up to 32 focus shifts with shifts in focal distance (range) that provide redundant image information. The electro-optics 16 also provide sub-pixel lateral image shifts between images, as will be explained in greater detail below. The redundant image information obtained via the shifts in focal distance and the lateral image shifts will be processed using super-resolution methods to provide a final image with resolution that is increased as compared to that of the native resolution of camera lens system 14. According to one embodiment, final image resolution is up to approximately twice that of the native resolution of camera lens system 14, such as a final image resolution of 1000 PPI, for example.

Referring still to FIG. 1, image capture device 10 also includes a fixed target generator 22 that is configured to generate a reference target point on the object being imaged. According to one embodiment, target generator 22 is in the form of a laser generator configured to direct a laser beam spot or other projected target onto the object 24, such as the hand of a subject—as illustrated in FIG. 1. Since the direction and position of the laser generator 22 is fixed relative to the camera lens system 14, the images acquired by the camera lens system 14 can be corrected for any shifts of the object 24 relative to the camera lens system 14 that might occur during image capture. Fixed target generator 22 thus operates similar to a guide star type reference used in telescope imaging, as generator 22 adds a fixed target to acquired images to serve as a reference that will connect the subject and camera. The inclusion of target generator 22 thus makes image capture device 10 robust to small motions. According to one embodiment, the image capture device 10 also includes a proximity sensing system 26 configured to sense a position of the object 24 relative to the image capture device 10 and, according to one embodiment, automatically triggers the data collection when the object is in the correct position to allow for image capture Referring now to FIG. 2, the electro-optics 16 of the image capture device 10 (FIG. 1) is shown according to an exemplary embodiment of the invention, with the electro-optics 16 including one or more polarizers 28, a plurality of polarization sensitive optical elements 30, and a plurality of polarization modulating elements 32. The polarizers 28 may be included in electro-optics 16 to orient the polarization of the light from polarization modulating elements 32 and polarization sensitive optical elements 30. In certain embodiments polarization may be applied to measure both specular and diffuse reflection, specifically wherein the polarized light is focused on a blue wavelength and a red wavelength. The polarization modulating elements 32 may be in the form of Faraday rotators, opto-electric crystals, wave plates, or liquid crystal panels (LCPs), for example. The polarization sensitive optical elements 30 are elements whose optical path length is dependent upon the orientation of the polarization of the light, such as a birefringent window or birefringent lens, to enable capture of the plurality of images at the different focal distances. The polarization sensitive optical elements 30 may comprise a transparent material such as, quartz, lithium niobate, calcite, yttrium orthovanadate, or another suitable like material, and are cut with a fast axis 34 perpendicular to the optical axis 36 of the image capture device 10. When the incoming light is polarized along the fast axis 34, the optical path is equal to L times $n_o$, and when the incoming light is perpendicular to the fast axis 34, the optical path is equal to L times $n_e$. The term L refers to the thickness of the optical elements 30, and the terms $n_o$ and $n_e$ refer to the refractive indices for polarizations perpendicular (ordinary) and parallel (extraordinary) to the axis of anisotropy respectively. In the case of crystal quartz, the index shift between the two orientations is around 0.018 RIU (refractive index units), such that a window, which is one centimeter thick, can provide a change in path length of 0.18 millimeters. Calcite has an index shift of about 0.16 RIU for an image shift of 1.6 millimeters for a 1-centimeter thick window. In comparison lithium niobate has an index shift of nearly 0.2 RIU, producing potential shifts of 1.9 millimeters compared to calcites' 1.6 millimeter.

Figure 2:
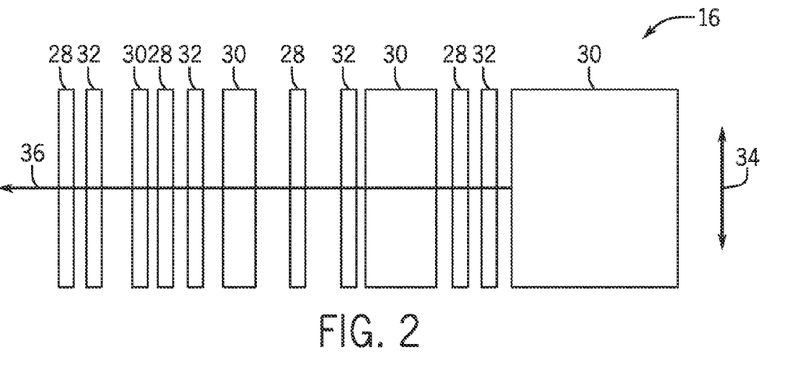
FIG. 2 is a multi-stage electro-optics arrangement for use with the image capture device of FIG. 1 according to an embodiment of the invention.

As shown in FIG. 2, the electro-optics 16 is configured as a multi-stage shifting apparatus. According to the embodiment of FIG. 2, electro-optics 16 includes a plurality of polarization modulating elements 32 (referred to generally hereafter as LCP rotators) and polarization sensitive optical elements 30 (referred to generally hereafter as birefringent elements) that provide for up to 32 focus planes, identified as 38, with redundancy between the planes so as to allow for a large number of images of the object to be acquired (i.e., oversampling), although it is recognized that other polarization modulating elements 32 and polarization sensitive optical elements 30 could be used in place of the LCPs and birefringent elements. In operation, a supplied electronic signal (i.e., voltage) from voltage source 18 is used to control the polarization rotation caused by the LCP rotators 32. One or more different voltages are applied to the LCP rotators 32 so as to cause a change in the orientation states thereof (i.e., cause the polarization rotation to change). Subsequently, this causes the light reflected from the object to see a different index of refraction path (i.e., rotate the linear polarization of light) within the birefringent elements 30, resulting in different optical path lengths. According to one embodiment, the electronic signal is supplied such that each LCP rotator 32 is able to switch the polarization of the light in millisecond timescales. When the polarization of the light rotates by 90 degrees, the light sees a different index of refraction in the birefringent elements 30, which then focuses image capture device 10 to a different effective focal distance/plane 38 (FIG. 1). Any variation in the optical path length results in changes in the focus/defocus on the images acquired by camera lens system 14, similar to a physical change in the distance between the object 24 and the camera lens system 14.

It is recognized that each added LCP rotator 32 and birefringent element 30 doubles the number of fixed focus positions/planes 38 that can be produced by the image capture device 10. Thus, for an image capture device 10 having electro-optics 16 that include three LCP rotators 32, eight separate focus planes 38 would be provided, whereas for an image capture device 10 having electro-optics 16 that include four LCP rotators 32, sixteen separate focus planes 38 would be provided. Using a focus step 40 of 2.5 millimeters between focus planes 38, eight images would provide a 20-millimeter range volume, and using 16 images would provide 40 millimeters of range (over 1.5 inches of capture range).

Various configurations of electro-optics 16 may be included in image capture device 10, however, each of the configurations includes LCP rotators 32 and birefringent optical elements 30 and polarizers 28 that are positioned between the camera lens system 14 and the object 24 to change the optical path length of the image capture device 10. It is recognized that each additional stage of LCP rotators 32, polarizers 28, and birefringent elements 30 added to electro-optics 16 decreases the intensity of light reflected back from the object 24 and received by camera lens system 14. That is, there is a potential light loss of about 30 percent with each stage of LCP rotators 32, polarizers 28 and birefringent elements 30 due to light absorption by the polarizers 28 as well as reflection and scattering loss from LCP rotators 32 and birefringent elements 30. However, the light loss is mitigated by a higher power light, such as the strobed LED light source 12 (FIG. 1) provided in image capture device 10. It is further recognized that image capture device 10 may comprise additional components beyond the LCP rotators 32, polarizers 28 and birefringent elements 30 set forth above. For example, components such as additional lens, mirrors, light filters, apertures, illuminating devices, and electronic components, are also envisioned as being included in image capture device 10.

Figure 3A:
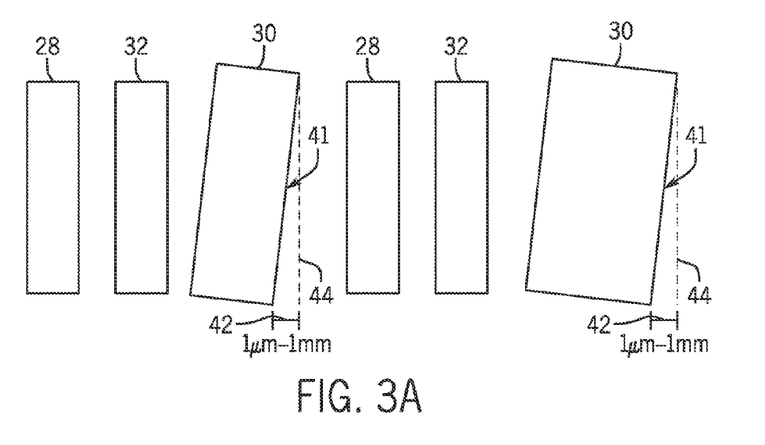
FIG. 3A is a view of a portion of the multi-stage electro-optics arrangement of FIG. 2 illustrating a tilted orientation of elements therein according to an embodiment of the invention.
Figure 3B:
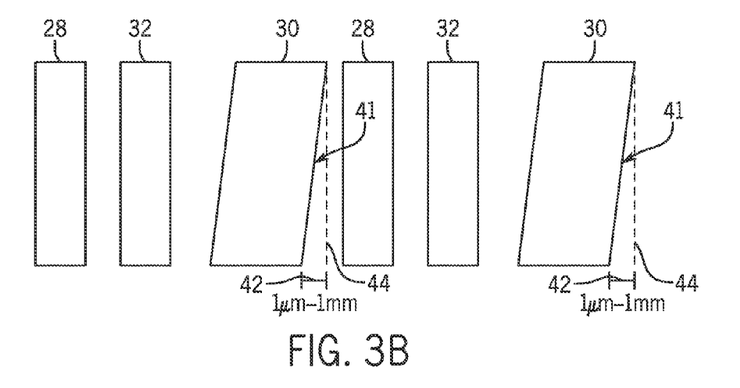
FIG. 3B is a view of a portion of the multi-stage electro-optics arrangement of FIG. 2 illustrating an optical wedge construction of elements therein according to an embodiment of the invention.

In addition to the object images captured having shifts in focal distance (i.e., depth/range), each of the object images that is captured also includes a small, lateral shift as compared to each other adjacent object image that is captured. The redundant object image data can purposely be made to have these small, known lateral shifts introduced by the LCP rotators 32, such that a series of images, each with a slightly different lateral shift, is generated. The small shifts, less that a pixel in size, are referred to as "sub-pixel image shifts" and function to generate the necessary images needed for use in super-resolution enhancement of the captured object images. According to embodiments of the invention, the sub-pixel lateral image shifts between focal planes is achieved by orienting one or more of the birefringent optical elements 30 relative to normal—i.e., an edge of the birefringent optical elements 30 is displaced relative to/from a plane normal to the optical axis 36 of the electro-optics 16/imaging device 10. This displacing of the edges of the birefringent optical elements 30 can be achieved via either mechanically tilting the optical elements or constructing the optical elements as optical wedges. In an embodiment where two of the birefringent optical elements 30 are displaced/tilted, the two elements will ideally be displaced/tilted in planes 90 degrees in rotation about the optical axis 36 relative to each other (although it is recognized that angles other than 90 degrees can work, as long as those angles are not close to or equal to zero). FIGS. 3A and 3B more clearly illustrate one or more of the birefringent optical elements 30 each having an edge 41 displaced by a small amount (indicated as 42) from a plane normal to the optical axis 36 (indicated as 44). According to embodiments of the invention, an edge 41 of birefringent element 30 can be displaced relative to the normal plane 44 by 1-10 microns, 10-50 microns, or 50-100 microns, or even up to a 1 mm displacement, such that the light passing through the birefringent elements 30 will form an image at different lateral locations depending on the polarization of light. In the embodiment shown in FIG. 3A, the birefringent optical elements 30 are "standard" shaped elements (i.e., rectangular elements with 90 degree corners) that are mechanically tilted by a small amount relative to/from normal 44, in order to provide the displacement of the edges 41 thereof relative to the normal 44. In the embodiment shown in FIG. 3B, the birefringent optical elements 30 are wedge elements constructed such that the edges 41 thereof are displaced relative to the normal 44, without any mechanical tilting being necessary. The wedge elements have a generally parallelogram shape that provides the displacement of the edges 41 from the normal 44.

Figure 4:
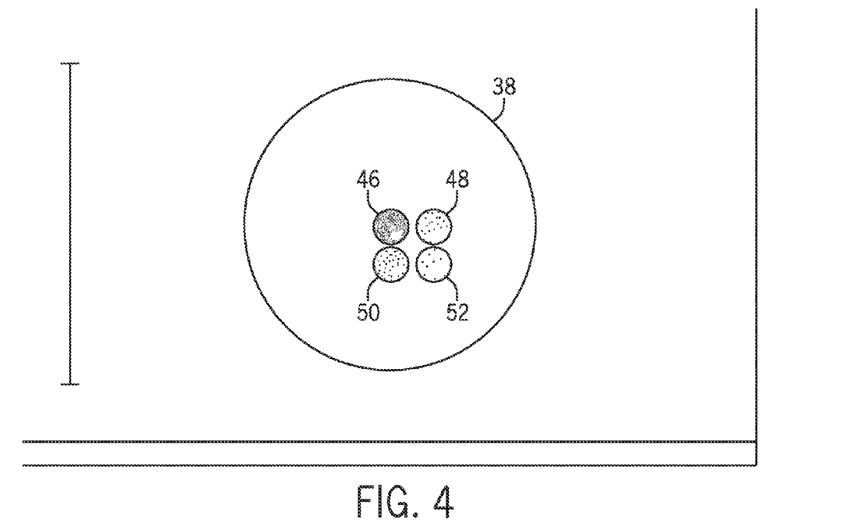
FIG. 4 is a diagram showing independent lateral image locations on a pair of sequentially acquired focal planes accomplished using the electro-optics arrangement of FIG. 2.

In generating the sub-pixel lateral image shifts between focal planes by orienting/tilting one or more of the birefringent optical elements 30 relative to normal, it is recognized that each combination of a birefringent element 30 and LCP rotator 32 provides two image locations. Thus, if a second LCP rotator 32 and birefringent element 30 are provided tilted in a plane that is rotated by 90 degrees about the optical axis relative to the first tilted birefringent element, four image shift locations can be achieved. A second polarizer 28 may also be added (although not required), to address the imperfect rotation provided by the LCP rotator(s) 32, with the additional polarizer 28 providing a higher distinction between the shifted image states. An exemplary shift pattern forming the 4 corners of a square of lateral shifts at different focal planes/distances that includes four sub-pixel image shift locations 46, 48, 50, 52 is illustrated in FIG. 4, according to an embodiment of the invention. In FIG. 4, the four independent lateral image locations 46, 48, 50, 52 occur on a set of 4 sequentially acquired focal planes 38. When images at 8 or 16 focal planes are acquired, the four independent lateral image locations 46, 48, 50, 52 are repeated in another set of four sequentially acquired focal planes 38 (i.e., multiple sets of four focal planes). It is recognized, however, that any number of focal planes in the range of 1 to 32 different focal planes can be acquired.

In operation, the electro-optics lens 16 can rapidly switch between locations by activation of the LCP rotators 32, so as to enable rapid acquisition of object images at different focal planes and at different lateral locations. That is, a voltage applied to the LCP rotators 32 (by voltage source 18) can be switched/varied at a high frequency so as to enable rapid acquisition of object images at different focal planes and at different lateral locations. In an exemplary embodiment, the voltage applied to the LCP rotators 32 can be switched/varied at a frequency of 1 to 200 Hz. Such switching speeds are typically not achievable in regards to generating the sub-pixel lateral image shifts, as such lateral shifts are typically achieved via shifts of the object or image sensor—neither of which can be performed at such high speeds. That is, cameras using image sensor shifting, for example, are limited in speed due to mechanical motion. The electro-optics lens 16, conversely, enables sub-pixel lateral image shifts without requiring motion of the object or sensor, as the tilt of birefringent element(s) 30 generates such lateral shifts responsive to the switched/varied voltage applied to the LCP rotators 32.

Regarding the redundant depth data and lateral image shifts (i.e., sub-pixel shifts) present in the object images, such data can be input into a super-resolution algorithm, such as one stored on control system/processor 20 (FIG. 1), in order to generate a composite image having roughly double the effective image resolution of the originally acquired object images. That is, a resolution of the object images captured by camera lens system 14 (FIGS. 1 & 2) can be increased in the composite object image by roughly a factor of two, by inputting the plurality of object images at the different focal distances—including the redundant depth data and lateral image shifts—into a super-resolution algorithm, such that a composite image including super resolution details is generated.

According to an exemplary embodiment, application of the super resolution processing algorithm, and its use of the over sampling and redundant data capture readily provided by the electro-optics 16 of the image capture device 10, results in a composite image having an increased spatial image resolution as compared to the resolution provided directly by the camera lens system 14 in image capture device 10. According to one embodiment, the image resolution provided by implementing the super resolution processing algorithm can be up to approximately twice that of the native resolution of camera lens system 14. Thus, for example, the image resolution of the composite image may be 1000 pixels-per-inch (PPI), as compared to the lower native spatial image resolution of 500-600 PPI provided by the camera 14 in image capture device 10.

Figure 5:
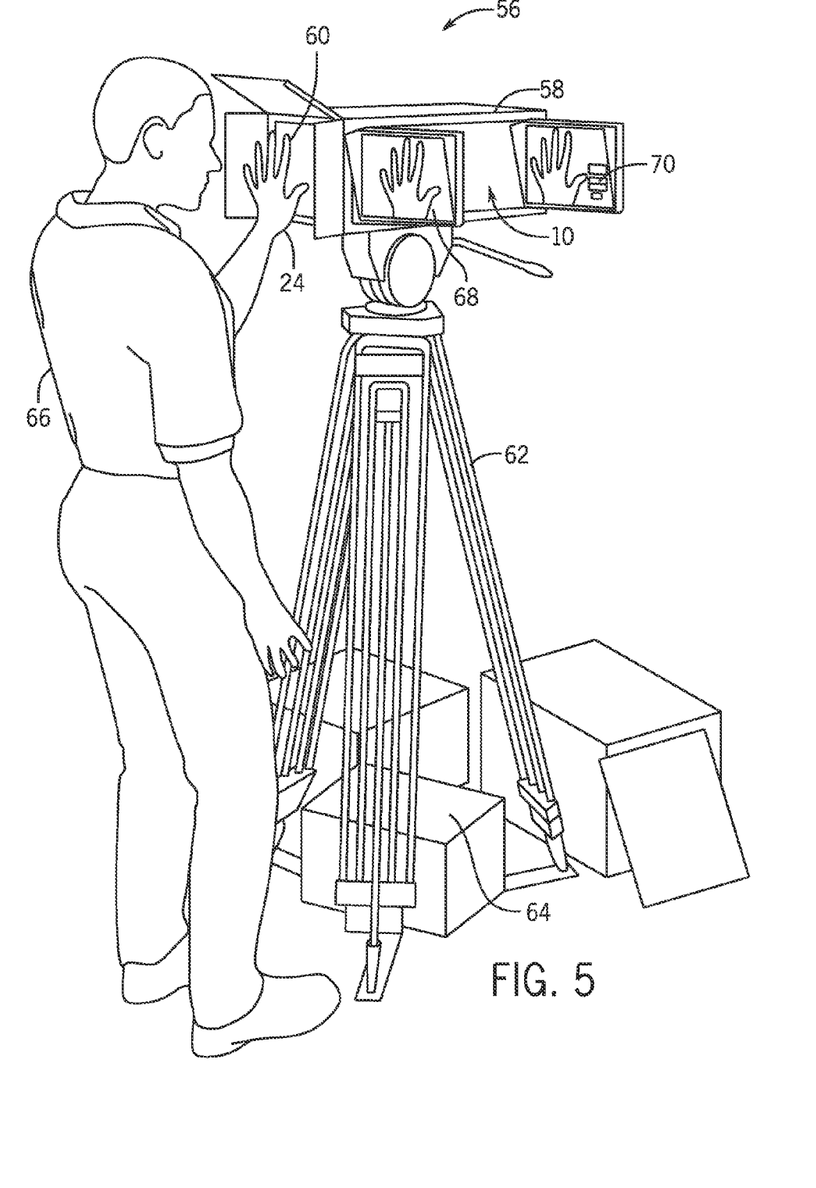
FIG. 5 is a perspective view of a contactless handprint capture device incorporating the image capture device of FIG. 1 according to an embodiment of the invention.

Referring now to FIG. 5, an implementation of the imaging device 10 (FIG. 1) and accompanying electro-optics 16 arrangement (FIG. 2) set forth in detail above into a contactless handprint collection device 56 is shown according to an exemplary embodiment of the invention. The contactless handprint capture device 56 provides a rolled equivalent handprint image that includes fingerprint and palm print images. In operation, the device rapidly captures a series/ plurality of single-shot images of the hand. Each of these images has a small depth-of-field, such that only a portion of the palm print and finger print regions of the hand can be in focus in any single image. As such, the images of the hand are taken at different and distinct effective focal distances (i.e., "depths") to the hand (e.g., 8 or 16 depths), with each focal distance being separated by a small increment from preceding/subsequent images. The multiple images of the hand are collected into one final composite image through processing, with the processing system determining which regions of each image are well focused and then combining the images using well-focused regions from each collected image to make the final composite image. Super-resolution processing is used to produce an output composite image with higher resolution than the input images, with the super-resolution processing being especially effective when regions of the hand are well focused in multiple input images. A three-dimensional (3D) model of the handprint is also constructed and is used to unroll the surface pattern data (fingerprints and/or palm print) present in the composite image to the equivalent of a flat image obtained from the hand, with the image having a super-resolution of 1000 pixels-per-inch (PPI) or more.

As shown in FIG. 5, the contactless handprint collection device 56 includes an outer housing 58 that encloses an image capture device 56 configured to acquire handprint images from a subject in a contactless manner, as will be described in greater detail below. The housing 58 of contactless handprint collection device 56 includes an imaging window/pane 60 in a front panel thereof that provides for imaging of a hand by way of image capture device 56. According to an embodiment of the invention, handprint collection device 56 is configured as a portable device that is transportable to and useable in various environments. A base 62 is included on handprint collection device 56 on which housing 58 and image capture device 56 are mounted, with the base 62 preferably being configured as an adjustable and collapsible base that provides ease of transportation and increases functionality of the handprint collection device 56. As shown in FIG. 5, base 62 can be in the form of a ruggedized tripod, according to one embodiment, although other suitable base designs are also envisioned as being within the scope of the invention. A portable power source 64, such as a battery, is also included in handprint collection device 56 and is used to power image capture device 56 and other electronics of the handprint collection device 56, thus providing for operation of device 56 in environments without access to an electrical grid.

In operation of device 56, a subject 66 positions a hand 24 in proximity to imaging window 60 to allow the image capture device 56 to collect images of the subject's hand once the hand is in position, such that multiple fingerprints and a palm print (i.e., a handprint) are acquired in a contactless manner. It is recognized that, in order for the contactless handprint collection device 56 to acquire handprint data from subject 66, the hand 24 of the subject must be properly positioned in proximity to imaging window 60 and relative to the image capture devices 56. That is, it is recognized that hand 24 must be properly positioned a desired/designated distance from the image capture device 56, so as to accommodate in-focus images of the hand at a specified focal distance or depth.

To achieve this, a user viewing monitor 68 and proximity sensing system 26 (FIG. 1) are provided on handprint collection device 56. User viewing monitor 68 functions as a positioning assistance device by providing feedback to subject 66 to properly position and orient their hand 24 proximate to imaging window 60, while proximity sensing system 26 senses a position of the subject's hand 24 relative to the image capture device 56 and, according to one embodiment, automatically triggers the data collection when the hand is in the correct position to allow for image capture. According to an embodiment of the invention, the user viewing monitor 26 displays the hand relative to a marker indicative of a desired hand position and provides a visual indication or alert to subject 66 when their hand 24 is in an acceptable position for imaging by image capture device 56. Also, according to one embodiment, proximity sensing system 26 further includes a hand tracking device or capability that provides for tracking a location of the hand relative to the image capture device 56 so as to provide feedback to the subject regarding the proximity of the hand to a desired imaging location.

As further shown in FIG. 5, an operator control monitor 70 is also included on handprint collection device 56. Operator control monitor 70 is positioned and configured to provide an operator with the capability to initiate a hand-scan procedure and view resulting data from such a scan. For example, operator control monitor 70 may provide feedback to the operator regarding positioning of the subject's hand 24 relative to the image capture device 56 during initiation a hand-scan procedure, such that operator may assist and instruct subject in positioning their hand. Upon completion of the hand-scan procedure, operator control monitor 70 may also provide resulting data and information on the captured handprint to the operator, including for example if the handprint matches any handprints stored in a handprint database.

With reference still to FIG. 5, and also back to FIGS. 1 and 2, operation of handprint capture device 56 is set forth in detail here below. In system operation, the subject 66 places their hand 24 in a particular orientation relative to image capture device 56 as directed by an operator and by using simple feedback from the handprint capture device 56, such as by way of user viewing monitor 68. As the system is a volumetric capture device, an exact positioning of the hand relative to image capture device 56 is not required, but rather hand 24 need only be placed in proximity to imaging window 60 and in a general shape/pose that exposes the handprint to image capture device 56. That is, handprint capture device 56 provides for volumetric capture of the hand, with an extended depth of capture so as to enable capture of a plurality of hand shapes and poses.

Upon placement of hand 24 in a desired location, handprint capture device 56 then captures multiple (e.g., 8 or 16) handprint images in a fast sequence using image capture device 56, with the handprint images being captured at different focal distances by controlling operation of electro-optics 16 in the image capture device. That is, a supplied electronic signal (i.e., voltage) from voltage source 18 is used to control the polarization rotation caused by polarization modulating elements 32 in electro-optics 16, with one or more different voltages being applied to the polarization modulating elements 32 so as to cause the polarization rotation to change. This causes the light to see a different index of refraction path within the polarization sensitive optical elements 30, resulting in different optical path lengths. Any variation in the optical path length results in changes in the focus/defocus on the images acquired by camera lens system 14, similar to a physical change in the distance between the hand 24 and the camera lens system 14, and providing for capturing of a plurality of handprint images, such as 8 or 16 images, at different focal distances or fixed focus positions 38.

Each handprint image is separated in range or depth from the previous image by a set amount, i.e., a focus step 40 (FIG. 1), and is optimally focused over a depth-of-field comparable to the separation of the focus planes. That is, the depth-of-focus of each handprint image that is captured is approximately equal to a size of the focus step 40 between each fixed focus position or imaging plane 38. According to one embodiment, a focus step of 2.5 millimeters is implemented, such that eight images would provide a 20-millimeter range volume, and using 16 images would provide 40 millimeters of range (over 1.5 inches of capture range). With a significantly enhanced capture depth of up to 40 millimeters, the ability to separately capture local regions of the hand becomes unnecessary, as every region on the hand can fall within the volumetric capture range, even allowing for some variation in hand position and shape. With the depth-of-focus of each handprint image that is captured being approximately equal to the size of the focus step 40 between each fixed focus position 38, redundant depth/range data is captured in the plurality of handprint images. This redundant data means that every region on the hand can fall within the capture range of some image, with the redundancy between the planes also providing for image oversampling.

In operation, handprint capture device 56 functions to register the handprint image captured at each different focal distance/fixed focus position 38 with positional data so as to create pixel correspondence between the handprint images and to provide registration between portions of the hand (i.e., between fingerprints and palm print), so as to generate "registered handprint images." That is, it is recognized that any movement of the hand during image capture may be interpreted as a shift of the image, so the image needs to be stabilized relative to the hand position, such that small image shifts can be maintained in a controlled manner. Each image is thus registered for position using a fixed reference target point projected onto the hand that is identifiable in each handprint image, such as a laser beam spot generated by fixed target generator 22. Since the direction and position of the fixed reference target point is fixed relative to the camera, the handprint image can be corrected for shifts of the hand relative to the camera. The desired image shift can then be introduced in a controlled manner within the sensor system. This image stabilization and registration is primarily to account for lateral shifts, but could provide information relative to focal distance changes and, if a simple cross is projected, even hand pose. For the purpose of image super-resolution, the registration relationships between the images (the lateral sub-pixel shifts), whether they are from the optical system, camera motion, or object motion, need to be known, but are not applied to the individual images to align the images. Super-resolution algorithms need to know the registration shifts, but the shifts are not applied to correct or stabilize the individual images.

In addition to capturing the plurality of handprint images at each of the different fixed focus positions at different focal distances and the registration of each of those images with positional data to provide "registered handprint images," handprint capture device 56 also functions to determine a 3D shape of the hand. That is, a contour map or "depth map" of the hand is calculated/generated using one of a depth from focus (DFF) algorithm and a depth from defocus (DFD) algorithm. The DFF analysis/calculation is an image analysis method combining multiple images captured at different focus distances to provide a 3D map correlating in-focus locations in each image with a known focus distance the specific image was captured at. The DFD analysis/calculation is an image analysis method combining the multiple handprint images captured at the different focus distances for calculating depth information by computing the degree of defocus blur in the images. That is, the DFD analysis/calculation uses the amount of defocus and the inherent impulse response function of the imaging device lens (i.e., how images change with focus for that lens) to provide range information.

Ideally, to maintain quality in DFF/DFD, the depth covered can be more than the depth of the hand, which provides flexibility in the actual location of the hand. That is, there should be an image collected at the two ends beyond the expected full range of image (i.e., beyond the far and near range points), plus one near the center to help remove any ambiguities in the range data. Beneficially, limiting the number of images used can reduce the processing needed to obtain sufficient 3D shape information on the hand; however, to collect the highest possible resolution data on the subject, it is desirable to collect a full set of clear images (each set made up of the phase shifted images) through the depth of the subject. To obtain good 3D data from DFF/DFD, the depth-of-field of the images used is controlled. To achieve depth information from the focus quality of the image, the system must be able to see a change in the focus quality in the form of a decrease in contrast of features. But for best data quality, the features of interest should be clearly resolved. In some cases, a small feature such as surface texture, or an added features such as a projected pattern, might be used to obtain the 3D information, while the features that of interest to record may be larger features.

The plurality of handprint images at the different focal distances and at shifted lateral locations, the registration information, and the 3D shape information (i.e., range) is combined by control system/processor 20 (FIG. 2) in imaging device 56 to create a best composite image—with the data being input into a super-resolution algorithm stored on control system/processor 20 in order to generate the composite image. The redundant depth data and lateral image shifts (i.e., sub-pixel shifts) present in the handprint images permits roughly a doubling of the effective image resolution, or "super-resolution," of the composite handprint image. That is, a resolution of the handprint images 56 captured by camera lens system 14 (FIGS. 2 & 3) can be increased in the composite handprint image by roughly a factor of two, by inputting the plurality of handprint images at the different focal distances, the registration information, and the 3D shape information into the super-resolution algorithm, such that a composite image including super resolution details is generated.

In another super-resolution process, a series of intermediate super-resolved images can first be generated, each with a different target focal distance. Each of these intermediate images will have high resolution, but will still have a small depth of field. That is, the handprint will be in focus only for the parts of the hand that are near the target focal distance. The target focal distances used for the series may correspond to the native focal distances of the imaging system 56, or some other series of focal distances that spans the imaged volume. This series of intermediate super-resolved images can be combined into a single final super-resolved image, where all parts of the image are in focus and have high resolution.

To generate a single intermediate super-resolved image with a targeted focal distance, the target focal distance for the image is first selected or determined. The four or so images with real focal distances nearest to the target focal distance are each somewhat in focus for the target focal distance and will be called the "contributing images" and will be used to generate the intermediate super-resolved image for this target focal distance. For an object at the target focal distance, the point spread function (PSF), or blur kernel, for each of the contributing handprint images is known from the optical design, and the sub-pixel registration shifts are known. The four contributing images, the corresponding PSFs, and the shifts are the complete set of inputs needed for a conventional frequency domain super-resolution process. The process will output the intermediate super-resolved image for the target focal distance.

To generate the final super-resolved image from the series of intermediate super-resolved images at target focal distances, one can use a process that merges the intermediate images in such a way that each region of the final image is composed from the intermediate image or images most in focus. This is done, for example, in readily available software, such as the Image Extended Depth of Field plug-ins that utilize a complex wavelet-based method or a model-based method.

According to an exemplary embodiment, application of the super resolution processing algorithm, and its use of the over sampling and redundant data capture readily provided by the system, results in a composite image having a spatial image resolution of 1000 pixels-per-inch (PPI), as compared to the lower native spatial image resolution of 500-600 PPI provided by the camera 14 in image capture device 56. A full hand composite handprint image at 1000 PPI is generated, with up to a 50 millimeter (2-inch) working distance. With a 2.5 millimeter step, the handprint image set will contain at least 4 images where any particular feature can be expected to be imaged at 1000 PPI effective resolution. The super-resolution process can thus produce an image with 1000 PPI effective sampled resolution. The 1000 PPI resolution of the composite handprint image is sufficient for biometric identification at level III performance levels, thus providing for image capture of fingerprint and palm print minutia details (minimum requirement of 500 PPI, Level II performance level) and perspiration pore details (minimum requirement of 1000 PPI, Level III performance level).

Incorporation of the image capture device 10 in the handprint collection device 56—and an electro-optics arrangement 16 such as shown in FIGS. 2 and 3 having tilted birefringent elements 30—enables the rapid capture of non-contact images of the hand, with individual images being expected to have exposure times less than 1/30 second, and with a total capture time of the 8-16 images taking less than 1 second. Rapid acquisition of handprint images at different focal planes and at different lateral locations is achieved via a switching of a voltage applied to the LCP rotators 32 (by voltage source 18) at a high frequency—with the sub-pixel lateral image shifts being enabled by way of the tilted of birefringent element(s) 30 and responsive to the switched/varied voltage applied to the LCP rotators 32.

Therefore, according to one embodiment of the invention, an image capture device configured to capture images of an object includes an imaging camera lens system and an electro-optics arrangement positioned between the object and the imaging camera, with the electro-optics arrangement further including one or more polarizers configured to orient a polarization of light passing therethrough, a plurality of polarization sensitive optical elements having an optical path length that changes with different polarization states so as to provide for capture of the object images at each of a plurality of different focal planes, and a plurality of polarization modulating elements configured to selectively control a polarization rotation of light input to the plurality of polarization sensitive optical elements responsive to voltages applied thereto, with the plurality of polarization sensitive optical elements comprising at least a first polarization sensitive optical element and a second polarization sensitive optical element, with the first polarization sensitive optical element and the second polarization sensitive optical element having an edge displaced relative to a plane normal to an optical axis of the electro-optics arrangement. The image capture device also includes a control system coupled to the electro-optics arrangement and being configured to control the application of voltages to each of the plurality of polarization modulating elements to control the polarization rotation of the light input to the plurality of polarization sensitive optical elements, such that the optical path length of the plurality of polarization sensitive optical elements is changed to provide for capture of the object images at each of the plurality of different focal planes. The first and second polarization sensitive optical elements generate lateral image shifts between respective object images captured at the plurality of different focal planes responsive to the polarization rotation of the light input thereto.

According to another embodiment of the invention, a method for acquiring images of an object via an image capture device includes providing an image capture device having an image forming optical lens and an electro-optic lens section, with the electro-optics lens section further including one or more polarizers configured to orient a polarization of light passing therethrough, birefringent windows that exhibit a different index of refraction depending on an input polarization of light passing therethrough wherein at least one of the birefringent windows has an edge displaced relative to a plane normal to an optical axis of the electro-optic lens section. and liquid crystal polarization rotators configured to selectively rotate an axis of the input polarization of light provided to the birefringent windows. The method also includes capturing an image of at least a portion of the object at each of a plurality of fixed focus positions by way of the image capture device, wherein capturing the object images at the plurality of fixed focus positions comprises selectively applying a voltage to the liquid crystal polarization rotators in the electro-optics lens section to rotate the axis of the input polarization of light provided to the birefringent windows and capturing an image of at least a portion of the object at each of the plurality of fixed focus positions responsive to the voltage applied to the liquid crystal polarization rotators, with images being captured at each of the plurality of fixed focus positions based on differing indexes of refraction of the birefringent windows. Each object image acquired at a respective fixed focus position has a sub-pixel lateral image shift as compared to object images acquired at adjacent fixed focus positions responsive to the axis rotation of the input polarization of light provided to the at least one birefringent window having the edge displaced relative to the plane normal to the optical axis of the electro-optic lens section.

According to yet another embodiment of the invention, an electro-optics lens section for use in an image capture device configured to capture objects of an image at a plurality of different focal planes is provided. The electro-optics lens section includes one or more polarizers configured to orient a polarization of light passing therethrough and a plurality of polarization sensitive optical elements having an optical path length that changes with different polarization states so as to provide for capture of the object images at each of a plurality of different focal planes, with the plurality of polarization sensitive optical elements including at least a first polarization sensitive optical element and a second polarization sensitive optical element, with the first polarization sensitive optical element and the second polarization sensitive optical element being tilted relative to a plane normal to an optical axis of the electro-optics lens section and tilted in planes 90 degrees in rotation about the optical axis relative to each other. The electro-optics lens section also includes a plurality of polarization modulating elements configured to selectively control a polarization rotation of light input to the plurality of polarization sensitive optical elements responsive to voltages applied thereto, so as to enable capture of object images at a plurality of different focal planes. The tilted first and second polarization sensitive optical elements generate lateral image shifts between respective object images captured at the plurality of different focal planes responsive to varying of the polarization rotation of the light input to the plurality of polarization sensitive optical elements resulting from the voltages applied to the plurality of polarization modulating elements, such that no mechanical motion of the electro-optics lens section is needed in generating the lateral image shifts.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An image capture device configured to capture images of an object, the image capture device comprising:
    an imaging camera lens system;
    an electro-optics arrangement positioned between the object and the imaging camera, the electro-optics arrangement including:
        one or more polarizers configured to orient a polarization of light passing therethrough;
        a plurality of polarization sensitive optical elements having an optical path length that changes with different polarization states so as to provide for capture of the object images at each of a plurality of different focal planes; and
        a plurality of polarization modulating elements configured to selectively control a polarization rotation of light input to the plurality of polarization sensitive optical elements responsive to voltages applied thereto;
    wherein the plurality of polarization sensitive optical elements comprises at least a first polarization sensitive optical element and a second polarization sensitive optical element, with the first polarization sensitive optical element and the second polarization sensitive optical element having an edge displaced relative to a plane normal to an optical axis of the electro-optics arrangement; and
    a control system coupled to the electro-optics arrangement and being configured to control the application of voltages to each of the plurality of polarization modulating elements to control the polarization rotation of the light input to the plurality of polarization sensitive optical elements, such that the optical path length of the plurality of polarization sensitive optical elements is changed to provide for capture of the object images at each of the plurality of different focal planes;
    wherein the first and second polarization sensitive optical elements generate lateral image shifts between respective object images captured at the plurality of different focal planes responsive to the polarization rotation of the light input thereto.

2. The image capture device of claim 1 wherein each of the first polarization sensitive optical element and the second polarization sensitive optical element is mechanically tilted from the plane normal to the optical axis such that the edge thereof is displaced relative to the plane normal to the optical axis.

3. The image capture device of claim 1 wherein each of the first polarization sensitive optical element and the second polarization sensitive optical element comprises a wedge element constructed such that the edge thereof is displaced relative to the plane normal to the optical axis.

4. The image capture device of claim 1 wherein the edges of the first polarization sensitive optical element and the second polarization sensitive optical element are displaced relative to the plane normal to the optical axis such that the edge of the first polarization sensitive optical element and the edge of the second polarization sensitive optical element are oriented in planes 90 degrees in rotation about the optical axis relative to each other.

5. The image capture device of claim 1 wherein the edges of the first polarization sensitive optical element and the second polarization sensitive optical element are displaced relative to the plane normal to the optical axis such that the edge of the first polarization sensitive optical element and the edge of the second polarization sensitive optical element are in planes relative to each other at an angle other than 90 degrees, so as to impart non-orthogonal lateral image shifts between respective object images captured at the plurality of different focal planes responsive to the polarization rotation of the light input thereto.

6. The image capture device of claim 1 wherein the lateral images shifts comprise sub-pixel shifts between respective object images captured at the plurality of different focal distances.

7. The image capture device of claim 1 wherein the tilted first and second polarization sensitive optical elements provide a square shift pattern at the plurality of different focal distances comprising four sub-pixel image shift locations.

8. The image capture device of claim 1 where each object image has a depth-of-focus that overlaps with a depth-of-focus of object images at adjacent focal planes such that redundant depth data is captured.

9. The image capture device of claim 8 wherein the control system is configured to:
    input the object images into a super-resolution algorithm, such that the redundant depth data and lateral image shifts of the object images are provided to the super-resolution algorithm; and
    generate a composite image from the super-resolution algorithm, such that the spatial resolution of the composite image is increased from a first image resolution level at which the object images are acquired to a second higher image resolution level.

10. The image capture device of claim 8 wherein each object image is separated in focal distance from other object images by a set focus step, and wherein the depth-of-focus of each object image is approximately equal to a size of the focus step.

11. The image capture device of claim 1 wherein the control system is configured to apply de-convolution to the acquired object images to correct for out of focus light.

12. The image capture device of claim 1 wherein the polarization modulating elements comprise at least one of Faraday rotators, optoelectric crystals, wave plates, and liquid crystal panels (LCPs) and wherein the polarization sensitive optical elements comprise at least one of birefringent windows and birefringent lenses.

13. The image capture device of claim 1 wherein the image capture device is configured to capture object images at 1 to 32 different focal planes, including at 4 different focal planes, 8 different focal planes or 16 different focal planes.

14. The image capture device of claim 1 wherein the image capture device further comprises a voltage source controlled by the control system to apply voltage to the plurality of polarization modulating elements to change orientation states thereof, so as to control the polarization rotation of light input to the plurality of polarization sensitive optical elements to vary an optical path length thereof.

15. A method for acquiring images of an object via an image capture device, the method comprising:
  providing an image capture device comprising an image forming optical lens and an electro-optic lens section, the electro-optics lens section further including:
    one or more polarizers configured to orient a polarization of light passing therethrough;
    birefringent windows that exhibit a different index of refraction depending on an input polarization of light passing therethrough, wherein at least one of the birefringent windows has an edge displaced relative to a plane normal to an optical axis of the electro-optic lens section; and
    liquid crystal polarization rotators configured to selectively rotate an axis of the input polarization of light provided to the birefringent windows; and
  capturing an image of at least a portion of the object at each of a plurality of fixed focus positions by way of the image capture device, wherein capturing the object images at the plurality of fixed focus positions comprises:
    selectively applying a voltage to the liquid crystal polarization rotators in the electro-optics lens section to rotate the axis of the input polarization of light provided to the birefringent windows; and
    capturing an image of at least a portion of the object at each of the plurality of fixed focus positions responsive to the voltage applied to the liquid crystal polarization rotators, with images being captured at each of the plurality of fixed focus positions based on differing indexes of refraction of the birefringent windows;
  wherein each object image acquired at a respective fixed focus position has a sub-pixel lateral image shift as compared to object images acquired at adjacent fixed focus positions responsive to the axis rotation of the input polarization of light provided to the at least one birefringent window having the edge displaced relative to the plane normal to the optical axis of the electro-optic lens section.

16. The method of claim 15 wherein the at least one birefringent window comprises a first birefringent window and a second birefringent window, with the first and second tilted birefringent windows providing a square shift pattern of sub-pixel lateral image shifts at the fixed focus positions comprising four sub-pixel image shift locations.

17. The method of claim 15 further comprising:
  registering the images captured at the plurality of fixed focus positions to create pixel correspondence between the images;
  determining a 3D shape of at least a portion of the hand using one of a depth from focus and a depth from defocus algorithm;
  inputting the registered images and the 3D shape into a super-resolution algorithm; and
  generating the composite image from the super-resolution algorithm, with the composite image having a second spatial resolution level that is increased from a first image resolution level at which the object images are acquired.

18. The method of claim 15 wherein capturing object images at the plurality of fixed focus positions comprises capturing object images at between 1 and 32 different fixed focus positions.

19. The method of claim 15 wherein the at least one birefringent window is mechanically tilted from the plane normal to the optical axis, such that the edge thereof is displaced relative to the plane normal to the optical axis.

20. The image capture device of claim 19 wherein the at least one birefringent window comprises a wedge element constructed such that the edge thereof is displaced relative to the plane normal to the optical axis.

21. An electro-optics lens section for use in an image capture device configured to capture objects of an image at a plurality of different focal planes, the electro-optics lens section comprising:
  one or more polarizers configured to orient a polarization of light passing therethrough;
  a plurality of polarization sensitive optical elements having an optical path length that changes with different polarization states so as to provide for capture of the object images at each of a plurality of different focal planes, the plurality of polarization sensitive optical elements including at least a first polarization sensitive optical element and a second polarization sensitive optical element, with the first polarization sensitive optical element and the second polarization sensitive optical element being tilted relative to a plane normal to an optical axis of the electro-optics lens section and tilted in planes 90 degrees in rotation about the optical axis relative to each other; and
  a plurality of polarization modulating elements configured to selectively control a polarization rotation of light input to the plurality of polarization sensitive optical elements responsive to voltages applied thereto, so as to enable capture of object images at a plurality of different focal planes;
  wherein the tilted first and second polarization sensitive optical elements generate lateral image shifts between respective object images captured at the plurality of different focal planes responsive to varying of the polarization rotation of the light input to the plurality of polarization sensitive optical elements resulting from the voltages applied to the plurality of polarization modulating elements, such that no mechanical motion of the electro-optics lens section is needed in generating the lateral image shifts.

22. The electro-optics lens section of claim 21 wherein the tilted first and second polarization sensitive optical elements provide a square shift pattern at the plurality of different focal distances comprising four sub-pixel image shift locations.

* * * * *